UNITED STATES PATENT OFFICE.

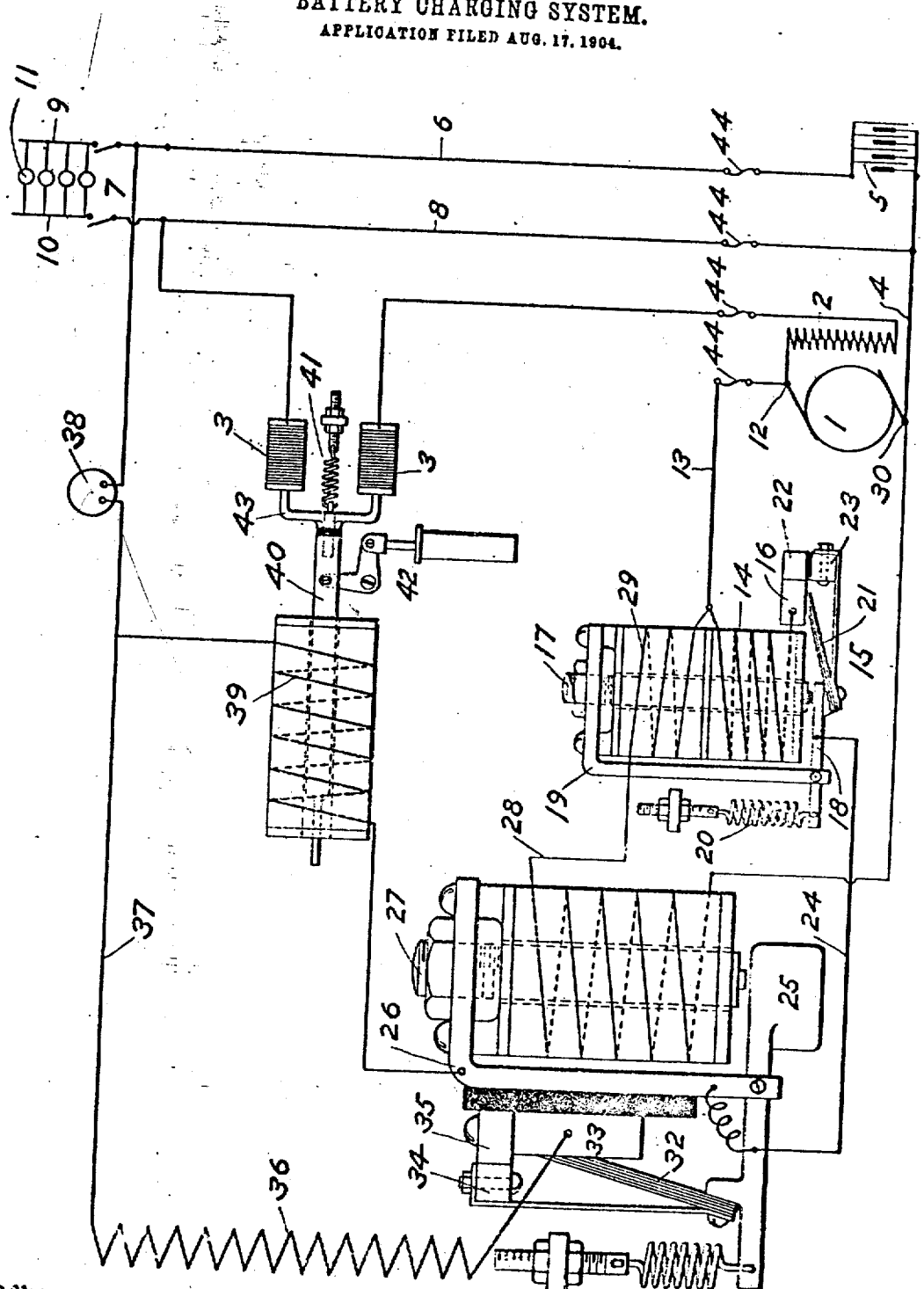

WILLIAM I. THOMSON, OF NEWARK, NEW JERSEY, ASSIGNOR TO THE SAFETY CAR HEATING & LIGHTING COMPANY, OF NEW YORK, N. Y., A CORPORATION OF NEW JERSEY.

BATTERY-CHARGING SYSTEM.

No. 838,822.  Specification of Letters Patent.  Patented Dec. 18, 1906.

Application filed August 17, 1904. Serial No. 221,069.

*To all whom it may concern:*

Be it known that I, WILLIAM I. THOMSON, residing at Newark, in the county of Essex and State of New Jersey, have invented certain new and useful Improvements in Battery-Charging Systems, of which the following is a full, clear, and exact description, such as will enable others skilled in the art to which it appertains to make and use the same.

This invention relates to generating systems particularly adapted for use in charging secondary or storage batteries.

Certain features herein shown and described are shown, described, and claimed in my copending application, filed July 18, 1904, Serial No. 216,923, and accordingly are not herein claimed.

One of the objects of this invention is to provide simple and efficient apparatus whereby the current used in charging a storage battery is automatically reduced upon the battery becoming fully charged and is automatically increased upon the charge of the battery falling below a certain point.

Another object is to provide means of the above type adapted for use in connection with a system of the nature of that described in my copending application above referred to.

Other objects will be in part obvious and in part pointed out hereinafter.

The invention accordingly consists in the features of construction, combinations of elements, arrangement of parts, and means for the utilization of principles which will be exemplified in the apparatus herein described and the scope of the application of which will be indicated in the following claims.

In the accompanying drawing is shown a diagrammatic plan of one of the various possible embodiments of my invention.

Preliminary to a description of this embodiment it may be noted that although there are certain advantages in the use of a constant-potential-generating system for charging storage batteries—such as, for example, the automatic cutting down of the flow of current therethrough as the battery charge increases—nevertheless the use of a constant-current system is for some reasons highly desirable. With a system of the last-mentioned type in general the available forces for use in regulation are greater than those in constant-potential systems and the moving parts are not necessarily so light, and consequently susceptible to jarring and other disturbing influences. Also in a constant-current regulation where the regulating apparatus is not cut in until the voltage of the generator equals that of the battery an increase of a certain amount in the total generator-voltage causes a larger proportional change in the current flowing from the generator to the battery than in the total voltage of the generator. For example, if the battery-voltage is one hundred, and ten amperes would flow through the same with a generator voltage of one hundred and five, the current flowing when the generator-voltage rises to one hundred and ten would be twenty amperes—a change in current of one hundred per cent. and a change in voltage of less than five per cent. The principal objection to constant-current charging is, as above indicated, the tendency to overcharge the battery, and it is true that although overcharging the battery by means of forcing a mild current through the same is beneficial thereto, yet to force a full current through the charged cell would in time ruin it. The above and other objections are overcome in constructions of the nature of that herein described.

Referring now to the drawing, 1 represents a shunt-wound generator having serially connected within the field 2 thereof a variable-resistance medium 3 3, which may consist of one or more series of carbon plates, the pressure with which these plates contact being varied, as hereinafter described. Connected to the generator 1, by means of conductor 4, is one terminal of a secondary or storage battery 5. It may here be noted that the terms "secondary" and "storage" as descriptive of a battery are used in this description and throughout the following claims as synonymous and as having their ordinary meaning familiar to those skilled in the art. The remaining terminal of battery 5 is connected by a conductor 6 to one pole of a double-pole switch 7, the other pole of which is connected by conductors 8 and 4 to the first-mentioned pole of the battery. The opposing contacts of double switch 7 are connected with the mains 9 and 10, between which are bridged lamps or other current-utilizing devices 11.

Leading from terminal 12 of generator 1 is a conductor 13, which passes through one coil 14 of a doubly-wound magnetic switch 15 and terminates at contact-block 16. Coacting with the core 17, about which this coil is wound, is an armature 18, pivotally mounted upon an arm 19, which is secured to the opposite end of core 17 in any desired manner. Armature 18 is normally held in a retracted position by means of an adjustable spring 20; but upon the force of this spring being overcome by the attraction of core 17 the armature is moved to a position adjacent thereto, in which the magnetic circuit through core 17, arm 19, and armature 18 is much improved. By means of this last-mentioned movement of armature 18 a contact-brush 21 mounted thereon is brought into engagement with contact-block 16, thus completing the circuit from the latter to armature 18. Carbon blocks 22 and 23 are preferably attached to contact-block 16 and contact-brush 21, respectively, and are so arranged as to engage one another before the engagement of the last-mentioned members and to remain in engagement after these parts have separated, so as to prevent burning of the contact-surfaces thereof.

Leading from armature 18 is a conductor 24, which makes connection with an armature 25, pivotally mounted upon the frame 26 of an electromagnetic switch, which embodies some of the more important features of my invention. Mounted upon frame 26 is a core 27, about which is wound a conductor 28, which is connected to the generator 1 at terminal 12 and passes through the remaining winding 29 of the previously-described switch 15. From the winding about the core 27 conductor 28 is carried to generator-terminal 30, as shown in the drawing. The coils in this circuit are preferably of fine wire and many turns, so as to be controlled substantially by the voltage of the generator. Armatures 18 and 25 are preferably pivotally mounted substantially at their centers of gravity, so as to reduce the effect of jars and vibrations thereon, and the latter is normally held in a retracted position by means of an adjustable spring 31. In this position the contact-brush 32, borne by the armature, is in electrical engagement with a contact-block 33, which is mounted upon and insulated from the frame 26. Contact-brush 32 and contact-block 33 are preferably provided with carbon blocks 34 and 35, respectively, which are similar in character and identical in function with the corresponding parts in the previously-described switch 15. With contact-brush 32 in engagement with its coacting contact-block the circuit is completed from armature 25 through these parts to a resistance-coil 36 and thence through conductor 37 and ammeter 38 to the conductor 6.

A shunt-circuit is completed from the frame 26 through a solenoid 39 to the conductor 37, as shown in the drawing. Solenoid 39 is arranged so as to control the movement of a core 40, which is preferably retracted by means of an adjustable spring 41 and the movement of which is retarded in any desired manner, as by means of a dash-pot 42. Although this device is specifically described and claimed in my copending application above referred to, it may be noted that by means of solenoid 39 the core 40 is controlled so as to vary the pressure upon the groups of carbon blocks or disks 3 by means of a yoke 43 in accordance with the amount of current flowing through this coil. As this pressure is varied the total resistance of variable-resistance medium 3, and consequently that of the field-circuit in which it is connected, as above described, is correspondingly varied and the field of the generator consequently made more strong or weak, according as the current through this coil is diminished or increased. In this manner the current through solenoid 39 is maintained substantially constant.

Fuses 44 are preferably disposed as indicated in the drawing to accomplish their ordinary functions and, if necessary, may be duplicated at any other desired points of the system.

The operation of the above-described embodiment of my invention is as follows: With the parts in normal position let it be assumed that the generator is started. The entire output of the generator is directed through conductor 13, coil 29, and conductor 28, no current flowing in the solenoid 39, thus enabling spring 41 to compress the variable-resistance medium 3 and reduce the total resistance of the field of the generator, enabling it more quickly to build up. Spring 20 is adjusted so as to permit armature 18 to be attracted by core 17, and thus close the circuit between contact-brush 21 and contact-block 16 when the voltage of the generator has become equal to that of the battery. A circuit is now complete from the generator through winding 14, contact-block 16, contact-brush 21, and conductor 24 to armature 25. From this point two paths are open to the current, one leading through contact-brush 32 and contact-block 33, which are normally held in engagement by means of spring 31, resistance-coil 36, conductor 37, conductor 6, and battery 5, thence to terminal 30 of the generator. The other path leads through the frame 26 of the switch-coil of solenoid 39 and leads to the conductor 37 and thence to terminal 30, as above described. Resistance-coil 36 is preferably so proportioned in resistance to that of coil 39 as to cause the greater portion of the current to flow through the former. With the parts in this condition the current is maintained substantially constant by means of solenoid 39 acting upon the variable resistance medium 3, and the batteries are charged at a substantially constant rate. The parts are so arranged and adjusted that upon the battery being charged to its full extent—as, for example, two and one-half volts per cell—the current passing through coil about core 27 will cause the attraction of armature 25, and thus open the circuit through resistance-coil 36 between contact-brush 32 and contact-block 33. The output of the generator is thus directed entirely through coil 39, and the field thereof is temporarily made much stronger, thus attracting core 40 and correspondingly increasing the resistance of resistance medium 3, so as to weaken the field of the generator and reduce the current flowing in this coil to its normal amount. The current passing through the battery may thus be reduced to any desired fraction of the full current and fluctuation thereof prevented by means of the regulating device, as above described. It will be obvious that upon the generator-voltage being reduced, as above set forth, below the value at which armature 25 was attracted this member will not necessarily fall away from the core, with a consequent oscillation upon the voltage being alternately raised and lowered, as by virtue of the armature coming into closer proximity to the attracting-core it will be held in position with a much weaker field than was originally required to attract it. Other factors, such as the friction and inertia of the moving parts in conjunction with the above change of position of the armature, absolutely do away with any tendency to oscillation of this part.

It will thus be seen that I have provided simple and efficient apparatus whereby constant-current-generating apparatus with all its inherent advantages may be safely and economically used for charging storage batteries. The apparatus required to accomplish this object is inexpensive and durable and may be applied to systems now in use, although it is peculiarly adapted for that in connection with which it is shown.

It will be apparent from the above description that the current may be reduced to any desired fraction of the full current by a proper adjustment of the relative resistances of coils 36 and 39, and by means of adjustable spring 31 this reduction may take place at any desired potential of the battery.

As many changes could be made in the above construction and many apparently widely different embodiments of my invention could be made without departing from the scope thereof, I intend that all matter contained in the above description and shown in the accompanying drawing shall be interpreted as illustrative and not in a limiting sense.

I desire it also to be understood that the language used in the following claims is intended to cover all of the generic and specific features of the invention herein described and all statements of the scope of the invention which as a matter of language might be said to fall therebetween.

What I claim as my invention, and desire to secure by Letters Patent, is—

1. In combination, a generator, an external circuit leading from the same comprising two paths in parallel and means adapted upon the voltage of said generator exceeding a certain point to open-circuit one of said paths and divert the external output of the generator through the other path.

2. In combination, a generator, an external circuit leading from the same comprising two paths of unequal resistance connected in parallel, and means adapted upon the voltage of said generator exceeding a certain point to open-circuit the path having the least resistance and divert the external output of the generator through the other path.

3. In combination, a generator, a circuit for the same comprising two paths connected in parallel, means controlled by the current in one of said paths adapted to maintain the current therein substantially constant, and means whereby upon the voltage of said generator exceeding a certain point the other of said paths is cut out.

4. In combination, a generator, a circuit for the same comprising two paths of unequal resistance connected in parallel, means controlled by the current in one of said paths adapted to maintain the current therein substantially constant, and means whereby upon the voltage of said generator exceeding a certain point the path of less resistance is cut out.

5. In combination, a generator, a circuit for the same comprising a plurality of paths connected in parallel, means controlled by the current in one of said paths adapted to maintain the current therein substantially constant, and means whereby upon the voltage of said generator exceeding a certain point another of said paths will be cut out.

6. In combination, a generator, a circuit for the same comprising a secondary battery having serially connected therewith two electrical conductors connected in parallel, and means whereby upon the voltage of said generator exceeding a certain point one of said conductors is opened and the current to said battery diverted through the other conductor.

7. In combination, a generator, a circuit for the same having therein a secondary battery, a portion of said circuit comprising two paths connected in parallel, means controlled by the current in one of said paths adapted to maintain the current therein substantially constant, and means whereby upon the voltage of said generator exceeding a certain point one of said paths is opened and the current to said battery diverted through the other path.

8. In combination, a generator, a variable-resistance medium serially connected in the field of said generator, a circuit for said generator comprising a solenoid adapted to control the resistance of said variable-resistance medium, a shunt about said solenoid, and means controlled by the voltage of said generator whereby upon said voltage exceeding a certain point said shunt is opened.

9. In combination, a generator, a variable-resistance device adapted to control the resistance of the field of said generator, a solenoid connected in the circuit of said generator adapted to control said variable-resistance device so as to maintain constant a current through said solenoid, a shunt about said solenoid, and means controlled by the voltage of said generator whereby upon said voltage exceeding a certain point said shunt is opened.

10. In combination, a generator, a high-resistance circuit bridged across the terminals of said generator, two switches, a main circuit comprising two paths connected in parallel and a plurality of electromagnetic means serially connected in said first-mentioned circuit controlling said switches, one of said switches controlling said second-mentioned circuit and the other controlling one of said paths.

11. In combination, a generator, a high-resistance circuit bridged across the terminals of said generator, two switches, a main circuit comprising a plurality of paths connected in parallel and a plurality of electromagnetic means serially connected in said first-mentioned circuit controlling said switches, one of said switches controlling said second-mentioned circuit and the other controlling one of said paths.

12. In combination, a generator, a high-resistance circuit bridged across the terminals of said generator, two switches, a main circuit comprising two paths connected in parallel, means controlled by the current in one of said paths adapted to maintain the current therein substantially constant, and a plurality of electromagnetic means serially connected in said first-mentioned circuit controlling said switches, one of said switches controlling said second-mentioned circuit and the other controlling one of said paths.

13. In combination, a generator, a high-resistance circuit bridged across the terminals of said generator, two switches, a main circuit comprising two paths of unequal resistance connected in parallel and a storage battery, means controlled by the current in one of said paths adapted to maintain the current therein substantially constant, and a plurality of electromagnetic means serially connected in said first-mentioned circuit controlling said switches, one of said switches controlling said second-mentioned circuit and the other controlling one of said paths.

14. In combination, a generator, a high-resistance circuit bridged across the terminals of said generator, a main circuit comprising two paths connected in parallel and a secondary battery, means in one of said paths adapted to control the field strength of said generator and maintain the current in said path substantially constant, and two magnetic switches the coils of which are serially connected in said first-mentioned circuit, one of which controls said second-mentioned circuit and the other of which controls one of said paths and is adapted to cut out said path upon the voltage of said generator exceeding a certain point.

15. A secondary battery, a plurality of conductors carrying current to said secondary battery, means adapted upon the voltage of said battery reaching a predetermined point to open-circuit one of said conductors, and means adapted automatically to maintain the current in the other of said conductors substantially constant.

16. In combination, a generator, a high-resistance circuit bridged across the terminals of said generator, a main circuit comprising two paths connected in parallel and a secondary battery, means in one of said paths adapted to control the field strength of said generator and maintain the current in said path substantially constant, and two magnetic switches the coils of which are serially connected in said first-mentioned circuit, one of which controls said second-mentioned circuit and the other of which is controlled by the voltage of said generator and is adapted to cut out one of said paths upon the charge of said battery exceeding a certain point.

17. In combination, a generator, a high-resistance circuit bridged across the terminals of said generator, a main circuit comprising two paths of unequal resistance connected in parallel and a storage battery, means controlled by the current in one of said paths adapted to maintain the current therein substantially constant, and two magnetic switches the coils of which are serially connected in said first-mentioned circuit, one of which controls said second-mentioned circuit and the other of which is controlled by the voltage of said generator and is adapted upon the charge of said battery reaching a certain point to cut out one of said paths.

In testimony whereof I affix my signature in the presence of two witnesses.

WILLIAM I. THOMSON.

Witnesses:
J. B. KNOX,
ROBERT S. BLAIR.